J. W. McLEAN.

Rotary Harrow.

No. 24,322.

Patented June 7, 1859.

Witnesses:
Samuel S. Strong
V. B. Oden

Inventor:
J. W. McLean

UNITED STATES PATENT OFFICE.

J. W. McLEAN, OF LEBANON, INDIANA.

IMPROVEMENT IN ROTARY HARROWS.

Specification forming part of Letters Patent No. 24,322, dated June 7, 1859.

*To all whom it may concern:*

Be it known that I, J. W. McLEAN, of Lebanon, in the county of Boone and State of Indiana, have invented certain new and useful Improvements in Rotary Harrows; and I do hereby declare that the following is a full, clear, and exact description of the same, reference being had to the accompanying drawings, forming part of this specification, in which—

Figure 1:
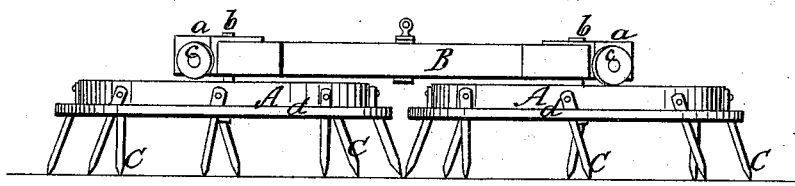
Figure 2:
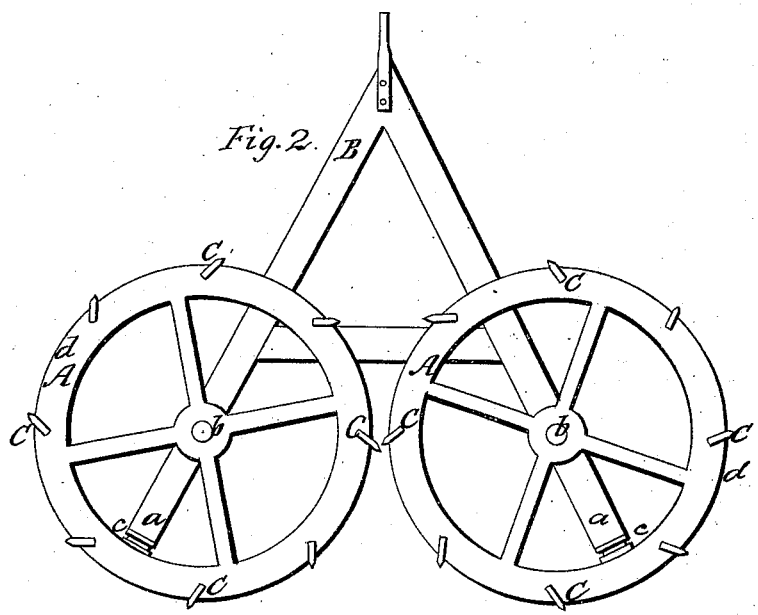

Figure 1 represents an end view of a rotary harrow constructed according to my invention, and Fig. 2 is an inverted plan of the same.

Similar letters of reference in the two views represent corresponding parts.

Before stating the nature of my invention I deem it proper to remark that I am aware that two circular harrows having perpendicular teeth and revolving in opposite directions are old. I am also aware that harrow-teeth have been set obliquely to a perpendicular, but not for the purpose I claim. The obliquity in previous devices is such that the points of the teeth describe a circle directly under the heads of the teeth, the object of the obliquity being simply to enable the harrow to take a firmer hold upon the soil, and thus insure its rotation.

The nature of my invention consists of the arrangement of the teeth on two harrows revolving in opposite directions, so that they shall set obliquely to a perpendicular and their points project out beyond the circumference of the rims of the frame, and the teeth of either harrow clear the teeth of its fellow of any obstructions or trash which may collect on it, and which, if not removed, would be liable to clog and prevent the rotation of the harrows.

To enable others skilled in the art to fully understand and construct my invention, I will proceed to describe it.

A A are two revolving wheels, which are attached to a common draft-pole, B, which has two arms, *a a*, which form the bearings for the pins *b b*, on which the wheels A A revolve, and to the ends of these arms the rollers *c c* are attached, which bear on one side of the upper surface of the wheels. Each of the wheels A A is provided with a flange, *d*, and the teeth C are fastened to the wheels in an inclined position by passing them through mortises in the flanges *d* and by riveting the same to the faces of the wheels, as clearly represented in Fig. 1. The size of the wheels is such that they nearly touch each other, and that the points of the teeth of one wheel pass close by those of the other one.

The operation is as follows: If the harrow is drawn along on the ground, those parts of the wheels lying under the rollers *c c* are a little more depressed into the ground, and the wheels will be caused to revolve in the direction of the arrows, and the inclined position of the teeth assists in imparting a rotary motion to the wheels; but by reason of this inclined position they are very apt to take up some dirt or trash, so that the operation of the harrow is greatly impeded. This difficulty is obviated by my arrangements, where the wheels are placed so close together and the teeth have such an inclination that those of one wheel clean those of the other one as they pass by each other in the center between the two wheels, and all the trash or dirt which may have accumulated between the teeth is thus cleared out with every revolution.

What I claim as my invention, and desire to secure by Letters Patent, is—

The combination of the within-specified obliquely-set teeth with two or more harrow-frames revolving in opposite directions, substantially as and for the purpose set forth.

J. W. McLEAN.

Witnesses:
SAMUEL S. STRONG,
V. B. ODEN.